United States Patent [19]

Tamm

[11] 4,066,574

[45] Jan. 3, 1978

[54] HYDROCARBON HYDROTREATING CATALYST COMPOSITION

[75] Inventor: Paul W. Tamm, Greenbrae, Calif.

[73] Assignee: Chevron Research Company, San Francisco, Calif.

[21] Appl. No.: 616,334

[22] Filed: Sept. 24, 1975

Related U.S. Application Data

[63] Continuation of Ser. No. 387,100, Aug. 9, 1973.

[51] Int. Cl.² .................. B01J 27/02; B01J 23/16; B01J 23/76; C10G 23/02
[52] U.S. Cl. ..................... 252/439; 252/465; 252/466 J; 208/216
[58] Field of Search ............. 252/465, 466 J, 439

[56] References Cited

U.S. PATENT DOCUMENTS

| | | | |
|---|---|---|---|
| 3,562,800 | 2/1971 | Carlson et al. | 208/216 |
| 3,630,888 | 12/1971 | Alpert et al. | 252/465 X |
| 3,692,698 | 9/1972 | Riley et al. | 252/439 |
| 3,694,351 | 9/1972 | White | 208/216 X |
| 3,785,967 | 6/1974 | Klinken | 208/216 |
| 3,814,683 | 6/1974 | Christman et al. | 208/216 |
| 3,840,473 | 10/1974 | Beuther et al. | 252/465 |
| 3,853,791 | 12/1974 | Feins | 252/465 |
| 3,873,470 | 3/1975 | Conway et al. | 252/466 J X |
| 3,894,966 | 7/1975 | Conway | 252/465 |
| 3,900,427 | 8/1975 | Riley et al. | 252/465 X |
| 3,900,430 | 8/1975 | Beaty, Jr. | 252/465 X |

*Primary Examiner*—Patrick P. Garvin
*Assistant Examiner*—William G. Wright
*Attorney, Agent, or Firm*—D. A. Newell; R. H. Davies; D. L. Hagmann

[57] ABSTRACT

Heavy oil feedstocks containing at least 20 ppm metals, particularly residuum feedstocks, are hydrodesulfurized using a catalyst prepared by impregnating Group VIb and Group VIII metals or metal compounds into a support comprising alumina wherein the support has at least 70 volume percent of its pore volume in pores having a diameter between 80 and 150 Angstroms and less than 3 volume percent of its pore volume in pores having a diameter above 1000 Angstroms. The catalyst preferably has at least 80 volume percent of its pore volume in pores having a diameter between 80 and 150 Angstroms and less than 1.5 volume percent of its pore volume in pores having a diameter above 1000 Angstroms. An especially outstanding hydrodesulfurization catalyst in terms of very low deactivation rate is attained by using an alumina support of the above pore size distribution or the above preferred pore size distribution and wherein the metals are impregnated into the catalyst in a single step impregnation using a solution of a cobalt or nickel salt and a heteropolymolybdic acid such as phosphomolybdic acid.

12 Claims, 2 Drawing Figures

HYDROCARBON HYDROTREATING CATALYST COMPOSITION

This is a continuation of application Ser. No. 387,100, filed Aug. 9, 1973, pending.

BACKGROUND OF THE INVENTION

The present application relates to catalytic hydrodesulfurization of sulfur-containing oils, in particular using a catalyst containing Group VIb and Group VIII metals and having a defined pore size distribution.

The need for desulfurization of oils is well known. Briefly stated, oils are needed as fuels to provide energy but most oils contain sulfur and burning these oils results in sulfur oxide pollutants. Thus, it is highly desirable to remove sulfur from the oil prior to burning the oil. Well-known catalytic hydrodesulfurization processes remove sulfur from oils by converting the organic sulfur compounds in the oil to hydrogen sulfide and sulfur-free organic compounds. The hydrogen sulfide can be relatively easily separated from the oil as hydrogen sulfide is a highly volatile, normally gaseous substance.

Typical operating conditions for hydrodesulfurization processes include a reaction zone temperature of 600° to 900° F, a pressure of 200 to 2000 psig, hydrogen feed rate of 500 to 15,000 SCF per barrel of oil feed, and a catalyst such as nickel or cobalt and molybdenum or tungsten on a porous refractory support.

A problem which has been recognized in the case of hydrodesulfurization of heavy oils is that if the heavy oils contain organometallic compounds the effective catalyst activity tends to decline relatively rapidly, particularly when the metals impurity is more than about 10 to 20 ppm metals such as dissolved nickel and vanadium. These metallic impurities are said to deposit on the surface and in the pores of the hydrodesulfurization catalyst.

One approach to this problem of metals impurity deactivation of hydrodesulfurization catalysts has been to alter the pore structure of the catalyst. However, the answer as to what pore structure is best has not been easily obtained and in fact there is a conflict in the answer suggested by the prior art. Exemplary patents concerned with pore size distribution of heavy oil hydrodesulfurization catalysts include the following.

U.S. Pat. No. 3,383,301 is directed to hydrodesulfurization using a catalyst satisfying the following pore size distribution:

"not more than 15 percent of the volume of the pores having a diameter in the range of 0 to 600 Angstroms in any 20 Angstroms increment of pore diameter in the range of pores having a 0 to 240 Angstroms diameter, and also having at least about 10 percent of such pore volume in pores having a diameter less than 60 Angstroms, at least 15 percent of such pore volume in pores having a diameter greater than 60 Angstroms and less than 140 Angstroms, and at least 30 percent of such pore volume in pores having a diameter greater than 140 Angstroms and less than 240 Angstroms."

U.S. Pat. No. 3,340,180 is similar to U.S. Pat. No. 3,383,301 but not as specific regarding pore size distribution. U.S. Pat. No. 3,340,180 requires less than 5 percent of the total pore volume in pores greater than 200 Angstroms in diameter and less than 10 percent of the pore volume in pores having a diameter greater than 160 Angstroms.

Three references found by hindsight in view of the present invention include Japanese publication No. 72/44001 (published Nov. 7, 1972, application No. 40,555/68) and Belgian Pat. Nos. 769,485 and 769,486, both granted Jan. 5, 1972.

The Japanese publication claims a hydrodesulfurization catalyst comprising a predominantly alumina carrier having more than 75 percent of the total pore volume in pores of 50 to 100 Angstroms in diameter, and does not specify the amount of pore volume in large pores such as pores above 1000 Angstroms in diameter.

The Belgian Pat. No. 769,485 is directed to hydrodesulfurization of residual oils using a catalyst whose particles have a pore volume greater than 0.30 ml/g, of which pore volume less than 10 percent is present in pores having a diameter of more than 1000 Angstroms and wherein the catalyst particles have an average pore diameter, expressed in Angstroms, of $75 \times d^{0.9}$ to $170 \times d^{0.9}$, where d represents the average particle diameter in mm. From Table A of Belgian 769,485 it is seen that catalysts with more than 3 volume percent of their total pore volume in pores greater than 1000 Angstroms in diameter gave good results in terms of the calculated deactivation rate constant, C. Catalysts with between 3 and 5 percent of their total pore volume in pores greater than 1000 Angstroms were among the very best in terms of the calculated deactivation rate constant. Three of the catalysts in Table A are listed as having less than 3 percent of the pore volume in pores greater than 1000 Angstroms. All three of these catalysts have an average pore diameter of 78 Angstroms but one of them had an unsatisfactorily high deactivation rate constant.

Belgian Pat. No. 769,486 is largely similar to Belgian Pat. No. 769,485, but the 769,486 reference is directed to a further preferred embodiment wherein the catalyst is used in suspension rather than as a fixed bed. In Table A of Belgian Pat. No. 769,486 the last column reports the calculated reaction velocity constant desulfurization in the stationary state in a reactor in which continuous renewal of the catalyst takes place with a velocity of 0.3 kilograms of catalyst per ton of fresh feed, the reaction velocity constant being labeled $k_e$. The highest value for the calculated $k_e$ is for a catalyst having 5.9 percent of its total pore volume in pores greater than 1000 Angstroms in diameter.

U.S. Pat. No. 3,509,044 discloses desulfurization of a residuum feed using a catalyst containing Group VIb and Group VIII metals on an alumina-low silica content refractory support and with the catalyst having a major portion of its surface area in pores ranging from 30 to 70 Angstroms in diameter.

U.S. Pat. No. 3,531,398 is similar to U.S. Pat. No. 3,509,044 but is directed to hydrodesulfurization of gas oils as opposed to residuum feedstocks. U.S. Pat. No. 3,531,398 requires the use of the catalyst which has a maximum of total surface area in pores having a diameter of 30 to 70 Angstroms and a minimum in pores having a diameter greater than 100 Angstroms. The gas oil feedstocks for the U.S. Pat. No. 3,531,398 process ordinarily have a low metals content "i.e. from 1 to 50 ppm, preferably 0.05 to 10 ppm metals."

U.S. Pat. No. 3,692,698 is also similar to U.S. Pat. No. 3,509,044 but requires a major portion of surface area in pores of 30 to 80 Angstroms in diameter and less than 4 percent of the total pore volume in pores of 200 to 2000

Angstroms, and at least 3 percent of the total pore volume in pores greater than 2000 Angstroms in diameter. Thus, U.S. Pat. No. 3,692,698 teaches that hydrodesulfurization catalysts should have a substantial amount of macropores, namely at least 3 volume percent of their pore volume from pores greater than 2000 Angstroms in diameter.

SUMMARY OF THE INVENTION

According to the present invention a process is provided for hydrodesulfurizing a hydrocarbon feedstock containing at least 10 ppm metals which comprises contacting the feedstock under hydrodesulfurization conditions with a catalyst prepared by impregnating Group VIb and Group VIII metals or metal compounds into a support comprising alumina wherein the support has at least 70 volume percent of its pore volume in pores having a diameter between 80 and 150 Angstroms and less than 3 volume percent of its pore volume in pores having a diameter above 1000 Angstroms.

Among other factors the present invention is based on my finding that an unexpectedly stable residuum hydrodesulfurization catalyst is attained when the pore size distribution is restricted to a maximum in a relatively narrow range between 80 and 150 Angstroms and further, contrary teachings of U.S. Pat. No. 3,692,698 notwithstanding, restricted to less than 3 percent of pore volumes from pores greater than 1000 Angstroms in diameter, preferably less than 1.5 percent of total pore volume from pores greater than 1000 Angstroms in diameter.

The process of the present invention is basically directed to residuum feedstocks as opposed to gas oil feedstocks. Residua feeds typically have greater than 10 ppm metals, whereas gas oils nearly always have less than 10 ppm metals, for example, usually only as high as 1 to 4 ppm metals even for heavy vacuum gas oils. Thus, typical feedstocks for the present invention are crude oil atmospheric distillation column bottoms (reduced crude oil or atmospheric column residuum), or vacuum distillation column bottoms (vacuum residuum). Very heavy gas oils may have greater than 10 ppm metals in which case the process of the present invention becomes applicable. However, a greater advantage is achieved in application of the present invention to feedstocks having greater than 20 ppm metals. Thus, I have found that the process of the present invention is most advantageously applied to residuum feedstocks which contain molecules of very high molecular weight and also greater than about 20 ppm metals. The metals are believed to be present as organometallic compounds, possibly in porphyrin- or chelate-type structures, but the concentration of metals referred to herein is calculated as parts per million pure metal.

Alumina is the preferred support material of the catalyst used in the process of the present invention although the alumina may be combined with other refractory support materials such as silica or magnesia.

In any event the support material comprising alumina must have the previously mentioned pore size distribution to give a catalyst in accordance with the requirements of the present invention. The pore size distribution for the alumina support used to form the finished catalyst is substantially similar to the finished catalyst pore size distribution — there is little change in pore size distribution upon impregnating the support with Group VIb and Group VIII metal compounds.

I have also found a preferred means of producing an alumina support having a pore size distribution in accordance with that required by the present invention. Relatively pure aluminas are available from several sources as spray-dried, amorphous or crystalline hydrate powders. These materials are suitable for extrusion when mixed with water only after addition of an extrusion aid. Two commonly used aids are a strong mineral acid or a combustible organic lubricant. The former usually leads to high density extrudates and the latter leads to pore size distributions containing substantial macropore volume, neither of which is acceptable in a residuum desulfurization catalyst support in accordance with the present invention. However, I have found a procedure by which such a material can be used to obtain a moderate-to-low density alumina having greater than 97 percent, usually greater than 99 percent, of its pore volume in the micropore region.

An amorphous or crystalline hydrate alumina powder, such as the powders mentioned above, is mixed with water such that the volatiles content of the resulting paste is in the range 45–75, preferably 55–65, weight percent. A strong mineral acid, such as nitric acid, is worked into this paste with intensive mixing. Acid is added until the resultant paste is completely dispersible when slurried in water (e.g. 4 parts water to 1 part paste). The pH of the water slurry is adjusted to within the range of 3.5–5.5, preferably 4–4.5. The acid concentration necessary is usually in the range of 4–6 weight percent. Extrusion at this point will give a high density alumina (~1.3 g/cc). The density can be reduced by addition of ammonium hydroxide to the paste with intensive mixing. The greater the addition of ammonium hydroxide, the lower the density. Addition of between 1 and 5 weight percent, preferably approximately 2 weight percent, of -molar ammonium hydroxide yields a moderate density alumina (~9–1.1 g/cc) having the desired pore size distribution after calcination at 500°14 1600° F.

Preferred hydrogenation components for the catalyst used in the process of the present invention are cobalt or nickel and molybdenum. I have found that an especially outstanding catalyst is made when the alumina support used not only has the pore size distribution required in accordance with the present invention but also wherein the catalyst is made by single step impregnation of the alumina using a solution of a cobalt or nickel salt and a heteropolymolybdic acid.

There appears to be a synergistic effect of using the above single step impregnation coupled with the alumina support of the defined pore size distribution with the resultant catalyst being more effective in terms of life (low deactivation rate) than would be expected from the simple addition of the pore size distribution benefit and the single step impregnation benefit. The preferred single step impregnation is described in more detail in commonly assigned patent application Ser. No. 333,098, filed Feb. 16, 1973.

Preferably the cobalt or nickel content of the preferred catalyst used in the process of the present invention is 2 to 5 weight percent calculated as the pure metal and the molybdenum content is preferably 5 to 20 weight percent calculated as the pure metal. It should be understood that the metals can be present in the final catalyst in compound form such as in the oxide or sulfide form as well as being present in the elemental form.

In the process of the present invention it is especially preferred to use a catalyst made from alumina having greater than 80 percent of its total pore volume in pores 80 to 150 Angstroms in diameter and less than 1.5 percent of its total pore volume from pores 1000 Angstroms in diameter or larger, more preferably yet, less than 1 percent of its total pore volume from pores greater than 1000 Angstroms in diameter. Comprehensive preferred pore size distribution are given in Table I below:

TABLE I

Preferred Pore Size Distribution For Catalyst Support

| | Pore Volume cc/gm | % of Total Pore Volume In Pore of Diameter | | | |
|---|---|---|---|---|---|
| | | <80Å | 80–150Å | 150–1000Å | >1000Å |
| Broader preferred range | 0.5–1.1 | <20 | >70 | <20 | <2 |
| Narrower preferred range | 0.65–0.85 | <10 | >85 | <5 | <1 |

FURTHER DESCRIPTION AND EXAMPLES

Figure 1:
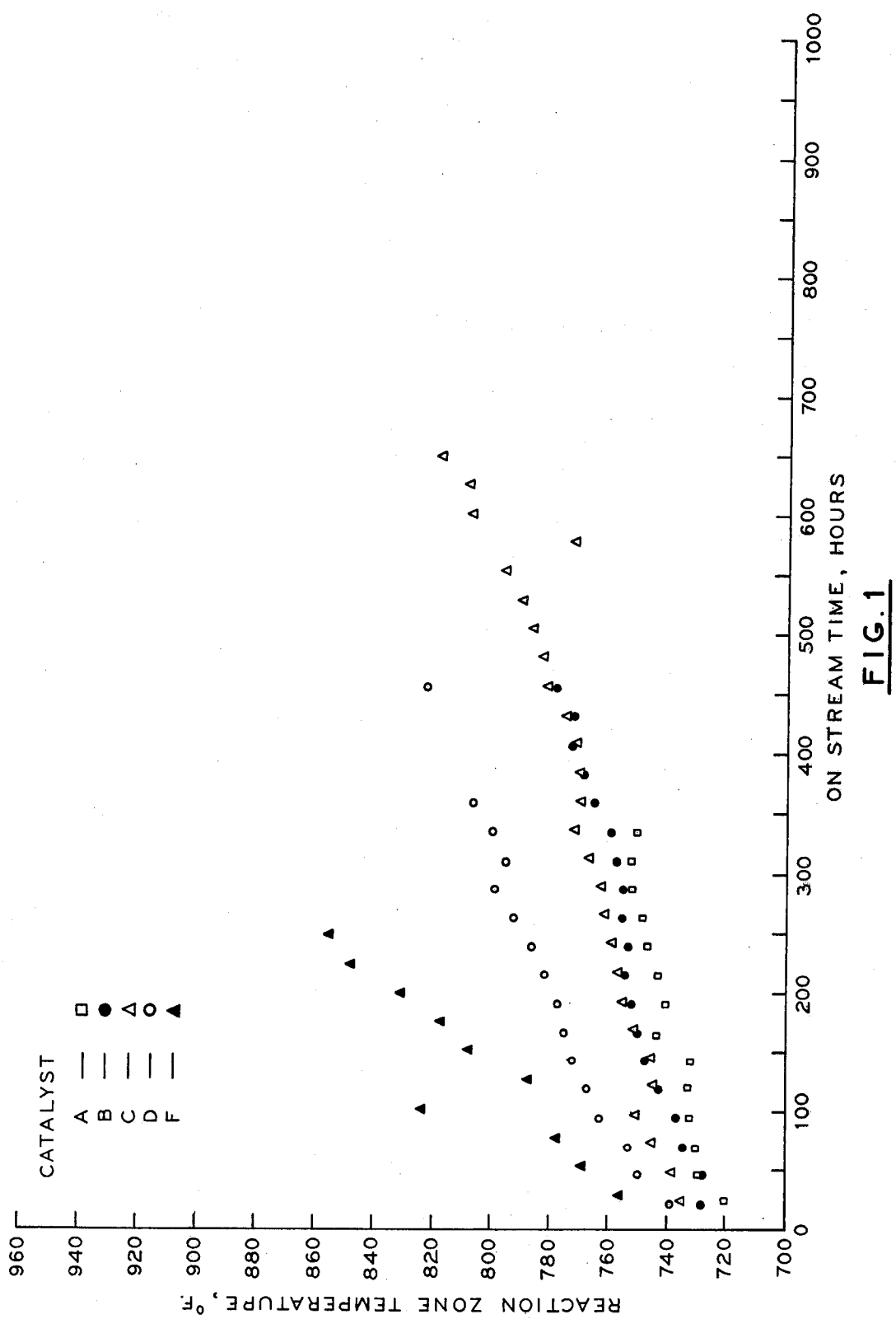
FIGS. 1 and 2 graphically show comparative deactivation data for hydrodesulfurization processes using catalysts made in accordance with the present invention and using catalysts not made in accordance with the present invention.

Referring in more detail to FIG. 1 the abscissa shows the hydrodesulfurization run time (continuous operation time) in hours and the ordinate shows the hydrodesulfurization reaction zone temperature in degrees Fahrenheit. The feed for the runs was an Arabian heavy residuum boiling above 570° F. having an API gravity of 14.0 and a sulfur content of 4.1 weight percent. Run conditions included a pressure of 1900 psig, and a temperature adjusted as shown on the ordinate to achieve a product sulfur content of 1 weight percent at an LHSV of 2.0. The catalysts used for the respective runs are summarized below in Table II. The support was calcined alumina and the metals in all cases were put on the catalyst by the preferred single step impregnation method. The alumina support was calcined at a temperature between 950° F and 1500° F before impregnation. After impregnation the catalyst was calcined at a temperature between 800° F. and 1100° F. The metals content for the finished catalyst is given at the far right of Table II.

TABLE II

Pore Size Distributions of Alumina Supports and Catalyst Compositions

| | Support | | | | | Ranking | Catalyst | |
|---|---|---|---|---|---|---|---|---|
| | Pore Volume | % of Total Pore Volume In Pores of Diameter | | | | In Terms of Deactivation | | |
| Catalyst | cc/gm | <80Å | 80–150Å | 150–1000Å | >1000Å | Rate | Wt.% Co | Wt.% Mo |
| A | 0.647 | 9.4 | 87.2 | 3.2 | 0.2 | 1 | 2.6 | 10.9 |
| B | 0.712 | 7.6 | 90.1 | 2.1 | 0.2 | 2 | 2.6 | 10.0 |
| C | 0.815 | 18.8 | 74.8 | 5.0 | 1.4 | 3 | 3.0 | 10.4 |
| D | 0.570 | 49.2 | 42.1 | 2.7 | 6.0 | 4 | 3.4 | 11.9 |
| F | 0.679 | 40.3 | 27.3 | 1.8 | 30.6 | 5 | 2.4 | 8.9 |

Catalysts in accordance with the present invention are A, B and C in Table II. As can be seen from the table, catalysts D and F had over 3 percent of their total pore volume in pores having a diameter greater than 1000 Angstroms and also less than 70 percent of their total pore volume in pores in the range 80 to 150 Angstroms whereas the opposite was true of catalysts A, B and C. Catalysts A, B and C gave much lower deactivation rates than did catalysts D and F. The above pore size distributions are in respect to the support, not the finished catalyst. However, as indicated previously, the pore size distribution of the finished catalyst is substantially similar to the pore size distribution of the alumina support onto which the active metals are impregnated. One reason the support is preferably used as the basis for defining pore size distributions is that contact angles involved in calculation of pore sizes can vary after impregnation of metals, and with the amount and type of metals impregnated onto the support, so that the calculation of pore sizes is somewhat less reproducible for the finished catalyst as opposed to the alumina support. Pore size distributions for the alumina used in the process of the present invention were obtained using mercury porosimetry, which technique is described by Winslow and Shapiri in "An Instrument for Measurement of Pore Size Distribution by Mercury Penetration," ASTM Bulletin, February 1959. Mercury contact angle in the pore is particularly important in pore size distribution calculations based on mercury penetration data. A contact angle of 140° was assumed in calculating all the pore size distributions referred to herein. For purposes of the present invention catalyst support pore sizes are to be determined by a mercury porosimeter using a contact angle of 140° in the pore size calculation.

TABLE III

Pore Size Distributions of Alumina Supports and Catalyst Compositions

| | Support | | | | | Ranking | Catalyst | |
|---|---|---|---|---|---|---|---|---|
| | Pore Volume | % of Total Pore Volume In Pores of Diameter | | | | In Terms of Deactivation | | |
| Catalyst | cc/gm | <80Å | 80–150Å | 150–1000Å | >1000Å | Rate | Wt.% Co | Wt. % Mo |
| G | 0.648 | 15.4 | 80.0 | 3.3 | 1.3 | 1 | 2.8 | 11.9 |
| H | 0.717 | 3.2 | 79.5 | 17.0 | 0.3 | 1 | 2.2 | 8.0 |
| I | 0.543 | 49.4 | 48.2 | 1.4 | 1.0 | 3 | 2.0 | 9.4 |
| J | 0.749 | 2.7 | 6.7 | 88.5 | 2.1 | 2 | 2.6 | 12.0 |
| K | 0.694 | 37.3 | 43.8 | 8.9 | 10.0 | 2 | 2.7 | 11.1 |
| L | 0.708 | 18.7 | 44.6 | 32.5 | 4.2 | 4 | 2.5 | 10.0 |

Figure 2:
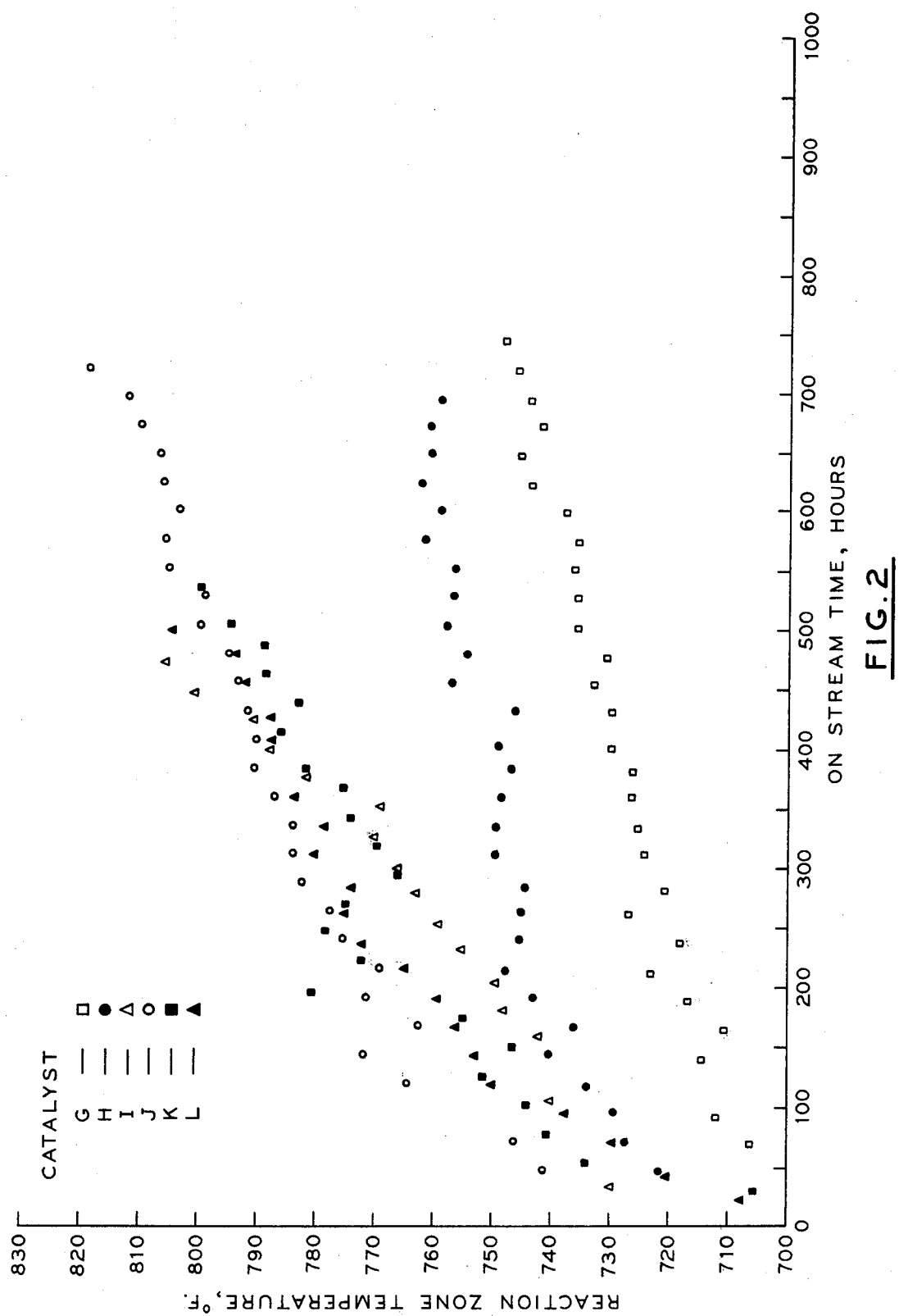

FIG. 2 is a graph similar to FIG. 1. The feed for the runs used to generate the data of FIG. 2 was an Arabian heavy residuum boiling above 500° F having an API gravity of 16.5 and a sulfur content of 3.85 weight percent. Run conditions included a pressure of 1900 psig and a temperature adjusted as shown on the ordinate to achieve a product sulfur content of 1 weight percent at a liquid hourly space velocity of 2.0. The catalysts used in the test run are summarized in Table III below. As in the case with the FIG. 1 data, the catalyst support was calcined alumina and the metals in all cases were put on the catalyst by the preferred single step impregnation method.

Catalysts in accordance with the present invention are G and H. As can be seen from FIG. 2, catalysts G and H resulted in exceptionally low deactivation rates compared to the other catalysts. Catalyst I, for example, had a reasonably low volume from pores greater than 1000 Angstroms in diameter but had only 48.2 volume percent of its total pore volume from pores in the range of 80 to 150 Angstroms. The life for catalysts H and G, the catalysts in accordance with the present invention, would be more than 100 percent greater than the life for a catalyst such as catalyst I.

What is claimed is:

1. A catalyst composition having an improved catalyst life and suitable for use in hydrodesulfurizing a hydrocarbon feedstock containing organometallic compounds in an amount, calculated as metal in parts by weight, of at least 10 ppm, said composition comprising an alumina support, a Group VIb component and a Group VIII component, said components being selected from the group consisting of the metals, oxides and sulfides of the elements of Groups VIb and VIII, said support having a pore volume in the range from about 0.5 to about 1.1 cubic centimeters per gram and having at least 70 percent of said pore volume in pores having a diameter between 80 and 150 Angstroms and less than 3 percent of said pore volume in pores having a diameter above 1000 Angstroms, said pore size distribution for said support corresponding to values obtained by using mercury porosimetry.

2. A composition as in claim 1 further characterized in that at least 80 percent of said pore volume is in pores having a diameter between 80 and 150 Angstroms and less than 1.5 percent of said pore volume in pores having a diameter above 1000 Angstroms.

3. A composition as in claim 2 further characterized in that said amount of pore volume in pores having a diameter above 1000 Angstroms is less than 1 percent.

4. A composition as in claim 1 further characterized in that said elements are selected from the group consisting of cobalt, nickel and molybdenum.

5. A catalyst composition having an improved catalyst life and suitable for use in hydrodesulfurizing a hydrocarbon feedstock containing organometallic compounds in an amount, calculated as metal in parts by weight, of at least 10 ppm, said composition comprising a support consisting essentially of alumina, a Group VIb component and a Group VIII component, said components being selected from the group consisting of the metals, oxides and sulfides of the elements of Groups VIb and VIII, said support having a pore volume in the range from about 0.5 to about 1.1 cubic centimeters per gram and having pore size distribution and contents corresponding to values as measured by the mercury porosimetry method:
  1. less than 20 percent of said pore volume in pores having a diameter below 80 Angstroms;
  2. at least 70 percent of said pore volume in pores having a diameter in the range between 80 and 150 Angstroms;
  3. less than 20 percent of said pore volume in pores having a diameter between 150 and 1000 Angstroms; and
  4. less then 2 percent of said pore volume in pores having a diameter above 1000 Angstroms.

6. A composition as in claim 5 further characterized in that said elements are selected from the group consisting of cobalt, nickel and molybdenum.

7. A composition as in claim 5 further characterized in that said pore volume is in the range from about 0.65 to about 0.85 cubic centimeters per gram and said pores having a diameter
  1. below 80 Angstroms constitute less than 10 percent of said pore volume;
  2. between 80 and 150 Angstroms constitute more than 85 percent of said pore volume;
  3. between 150 and 1000 Angstroms constitute less than 5 percent of said pore volume; and
  4. above 1000 Angstroms constitute less than 1 percent of said pore volume.

8. A composition as in claim 7 further characterized in that said elements are selected from the group consisting of cobalt, nickel and molybdenum.

9. A composition as in claim 5 further characterized in that said catalyst contains cobalt and molybdenum in about 3 and 11 weight percent, respectively; and said pore volume is about 0.65 cubic centimeter per gram, said pores having a diameter below 80 Angstroms constitute about 9 percent of said pore volume, said pores having a diameter between 80 and 150 Angstroms constitute about 87 percent of said pore volume; said pores having a diameter between 150 and 1000 Angstroms constitute about 3 percent of said pore volume; and said pores having a diameter above 1000 Angstroms constitute about 0.2 percent of said pore volume.

10. A catalyst composition as in claim 5 further characterized in that said catalyst contains cobalt and molybdenum in about 3 and 11 weight percent, respectively, said pore volume is about 0.71 cubic centimeter per gram, said pores having a diameter below 80 Angstroms constitute about 8 percent of said pore volume; said pores having a diameter between 80 and 150 Angstroms constitute about 90 percent of said pore volume, said pores having a diameter between 150 and 1000 Angstroms constitute about 2 percent of said pore volume, and said pores having a diameter above 1000 Angstroms constitute about 0.2 percent of said pore volume.

11. A catalyst composition as in claim 5 further characterized in that said catalyst contains cobalt and molybdenum in about 3 and 12 weight percent, respectively; said pore volume is about 0.65 cubic centimeters per gram, said pores having a diameter below 80 Angstroms constitute about 15 percent of said pore volume, said pores having a diameter between 80 and 150 Angstroms constitute about 80 percent of said pore volume; said pores having a diameter between 150 and 1000 Angstroms constitute about 3 percent of said pore volume, and said pores having a diameter above 1000 Angstroms constitute about 1 percent of said pore volume.

12. A catalyst composition as in claim 5 further characterized in that said catalyst contains cobalt and molybdenum in about 2-8 weight percent, respectively; said pore volume is about 0.72 cubic centimeter per gram, said pores having a diameter below 80 Angstroms constitute about 3 percent of said pore volume, said pores having a diameter between 80 and 150 Angstroms constitute about 80 percent of said pore volume, said pores having a diameter between 150 and 1000 Angstroms constitute about 17 percent of said pore volume, and said pores having a diameter above 1000 Angstroms constitute about 0.3 percent of said pore volume.

* * * * *